US008149803B2

(12) United States Patent
Pan et al.

(10) Patent No.: US 8,149,803 B2
(45) Date of Patent: Apr. 3, 2012

(54) APPARATUS FOR A BEACON-ENABLED WIRELESS NETWORK, TRANSMISSION TIME DETERMINATION METHOD, AND TANGIBLE MACHINE-READABLE MEDIUM THEREOF

(75) Inventors: Meng-Shiuan Pan, Yi-Lan (TW); Lun-Wu Yeh, Hua-Lien Hsien (TW); Yu-Chee Tseng, Hsinchu (TW); Li-Chun Ko, Taipei (TW); Hua-Wei Fang, Kaohsiung (TW); Chi-Wen Teng, Sanchong (TW)

(73) Assignee: Institute for Information Industry, Taipei (TW)

( * ) Notice: Subject to any disclaimer, the term of this patent is extended or adjusted under 35 U.S.C. 154(b) by 1139 days.

(21) Appl. No.: 11/960,438

(22) Filed: Dec. 19, 2007

(65) Prior Publication Data

US 2009/0059886 A1    Mar. 5, 2009

(30) Foreign Application Priority Data

Aug. 31, 2007    (TW) .............................. 96132433 A

(51) Int. Cl.
*H04W 4/00*    (2009.01)
*H04J 3/00*    (2006.01)
(52) U.S. Cl. ....................................... 370/338; 370/345
(58) Field of Classification Search .................. None
See application file for complete search history.

(56) References Cited

U.S. PATENT DOCUMENTS

2003/0169697 A1* 9/2003 Suzuki et al. ................. 370/310
2008/0013498 A1* 1/2008 Sugaya et al. ................ 370/337

OTHER PUBLICATIONS

Ergen, Sinem Coleri, "Zigbee/IEEE 802.15.4 Summary", Sep. 10, 2004.*

* cited by examiner

*Primary Examiner* — John Blanton
(74) *Attorney, Agent, or Firm* — Patterson Thuente Christensen Pedersen, P.A.

(57) ABSTRACT

An apparatus for a beacon-enabled wireless network, a transmission time determination method, and a tangible machine-readable medium thereof are provided. The apparatus is located within the coverage area of the first equipment. The second equipment is located within the coverage area of the apparatus. The apparatus comprises a receive/transmission module and a decision module. The receive/transmission module is configured to receive the beacon of the first equipment. The decision module is configured to decide information of an upload time slot and a download time slot of the apparatus according to the beacon so that the receive/transmission module can perform data transmission with the first equipment by the upload time slot and perform data transmission with the second equipment by the download time slot. According to the aforementioned allocations, transmission collisions can be avoided and delay of transmission times is decreased.

15 Claims, 8 Drawing Sheets

APPARATUS FOR A BEACON-ENABLED WIRELESS NETWORK, TRANSMISSION TIME DETERMINATION METHOD, AND TANGIBLE MACHINE-READABLE MEDIUM THEREOF

This application claims the benefit of priority based on Taiwan Patent Application No. 096132433 filed on Aug. 31, 2007, the disclosure of which are incorporated herein by reference in its entirety.

CROSS-REFERENCES TO RELATED APPLICATIONS

Not applicable.

BACKGROUND OF THE INVENTION

1. Field of the Invention

The present invention relates to an apparatus for a beacon-enabled wireless network, a transmission time determination method, and a tangible machine-readable medium thereof. More particular, the present invention relates to an apparatus for reducing the delay of the transmission time in a beacon-enabled wireless network, a transmission time determination method, and a tangible machine-readable medium thereof.

2. Descriptions of the Related Art

For many wireless network applications, apparatuses on wireless networks usually have to transmit data (e.g., sensing data and data packets) generated in the application layer amongst each other. However, in some special network applications such as monitoring and security applications, apparatuses are not required to transmit data at all time. Instead, these apparatuses may go into a hibernation mode to conserve power. A beacon-based wireless network may satisfy such a requirement. Currently, the most clearly defined specification for the operation architecture of beacon-enabled wireless networks is the IEEE802.15.4b standard. The wireless networks can be star-like structures, peer-to-peer structures or spanning tree structures.

Network devices conforming to the IEEE 802.15.4b standard may be divided into two categories: the full-function device (FFD) and the reduced-function device (RFD). The FFDs have the functions of a Personal Area Network coordinator (PAN coordinator, serving as a main node), a coordinator (serving as a relay node), and an RFD (serving as a terminal point). The FFDs can perform data transmission with FFDs and RFDs. In contrast, the RFDs are very simple network devices, which can only perform data transmission with FFDs. In other words, RFDs can only be used in combination with a single coordinator and are not able to participate in mass data transmission. Furthermore, the need for system sources is relatively low.

FIG. 1 illustrates a beacon-enabled wireless network 1 of a spanning tree based on the IEEE 802.15.4b standard. The circles in FIG. 1 represent various nodes (i.e., the aforementioned coordinators serving as either a main node or relay nodes) in the wireless network 1. There is one main node 10 in the wireless network 1, which serves as a root node and may be connected to a number of relay nodes 110~114 as its child nodes. The relay nodes may in turn be connected to a number of relay nodes as their child nodes. For example, the relay node 111 is connected to relay nodes 115, 116. Any two nodes connected by a solid line in FIG. 1 have a parent-child relationship. Furthermore, each of the nodes in the FIG. 1 may also perform data transmission with other terminal points (i.e. RFDs, not shown).

In the IEEE 802.15.4b standard, the FFDs play the role of the main node/relay nodes utilizing the superframe structure, according to which the time interval defined by two successive beacon packets transmitted by the same node (i.e. the main node or the relay nodes) is known as a beacon interval (BI). The purpose of beacon packet transmissions is to synchronize the individual nodes within a coverage area, where these nodes allocate the transmission time using a technology similar to the time division multiple access.

The main node 10 of the wireless network 1 sends a beacon packet to announce the superframe format. The time during the superframe is divided into a plurality of time slots, one of which is occupied by the main node to receive or to transmit data from or to other nodes in the wireless network 1, while the remainders of which are available for use by other nodes. The relay nodes also announce the time slots they are occupying by sending a beacon packet.

FIG. 2 depicts the schematic diagram of a superframe structure, wherein the beacon packets 21a, 21b are the beacon packets sent by the relay node 111, and the time interval defined between them is known as the beacon interval 23. In the beacon interval 23, an incoming superframe 24a is defined for data transmission with its parent node. Upon receiving the beacon packet 21a from the relay node 111, the relay node 116 may transmit data to or receive data from the relay node 111 in a time slot that the relay node 111 occupied in the incoming superframe 24a. On the other hand, the relay node 116 may define an outgoing superframe 24b in the beacon interval 23, which is used for data transmission with its child nodes. The relay node 116 may send another beacon packet 22 in such an outgoing superframe to inform other nodes, and terminal points (not shown) connected with the relay node 116 may perform data transmission with the relay node 116 in the outgoing superframe 24b.

The nodes in the wireless network 1 can not arbitrarily select time slots to transmit beacons. Instead, when the relay node 116 intends to transmit data to the main node 10, it has to wait for a beacon packet from its parent node (i.e., the relay node 111). If another relay node 115 neighbors on the relay node 116 and selects the same time slot with the relay node 111, the two nodes 111 and 115 would send beacon packets simultaneously. This leads to a collision of the beacon packets at the relay node 116. Consequently, the relay node 116 would then fail to receive a beacon packet from the relay node 111, making it impossible for the relay node 116 to transmit data to the relay node 111. If many collisions occurred in the network, the wireless network 1 operations would crash completely. In order to avoid such collisions, any two nodes connected by a dashed line in FIG. 1 cannot have the same time slot.

In addition to the beacon packet collisions, the transmission delay is an important factor when the beacon packet transmissions are scheduled. FIG. 3A depicts an example of a beacon scheduling scheme in the case of a data upload, where the horizontal axis represents time. This beacon scheduling scheme represents a schedule for the main node 10 and the relay nodes 111, 115, 116, in the wireless network 1. The data flows from the relay nodes 111, 115, 116 to the main node 10. In FIG. 3A, the transmissions indicated by arrows 31, 32, 33, 34 respectively represent beacon transmissions scheduled for the relay nodes 116, 115, 111, and the main node 10. The relay node 116 occupies time slots 311, 312, the relay node 115 occupies time slots 321, 322. Similarly, the relay node 111 occupies time slots 331, 332, and the main node 10 occupies a time slot 341.

The beacon transmissions in FIG. 3A are scheduled in the following order: the relay node 116, the relay node 115, the relay node 111 and the main node 10. Therefore, the time slot 311 is firstly scheduled for the relay node 116, followed by the time slot 321 scheduled for the relay node 115, the time slot 331 scheduled for the relay node 111, the time slot 341 scheduled for the main node 10, the time slot 312 scheduled for the relay node 116, and so on.

The main node 10 and the relay nodes 111, 115, 116 are configured to send a beacon packet at the beginning of the time slot they occupy to inform other nodes to perform data transmission. Specifically, a beacon 31a is first sent by the relay node 116 in the time slot 311, so that a connected terminal point (not shown) may perform data transmission with the relay node 116, as shown by the dashed arrow 31c. Subsequently, a beacon 32a is sent by the relay node 115 in the time slot 321, so that a connected terminal point (not shown) may perform data transmission with the relay node 115, as shown by the dashed arrow 32c. Then, a beacon 33a is sent by the relay node 111 in the time slot 331, so that a connected terminal point (not shown) may perform data transmission with the relay node 111, as shown by the dashed arrow 33c. At this point, the relay nodes 115, 116 also perform data transmission with the relay node 111 respectively, as shown by the dashed arrows 31d, 32d. Thereafter, a beacon 34a is sent by the main node 10 in the time slot 341, so that a connected terminal point (not shown) may perform data transmission with the main node 10, as shown by the dashed arrow 34c. At this point, the relay node 111 also performs data transmission with the main node 111, as shown by the dashed arrow 33d.

According to the structure of FIG. 1 and the scheduling scheme of FIG. 3A, when the node 115 intends to transmit data to the main node 10, two hops have to be performed in slots 321 and 331. Assuming that one superframe lasts 5 minutes and has 100 time slots, so each time slot lasts 3 seconds. Thus, the node 116 needs 6 seconds (3 sec×2 hops=6 sec) to reach a destination. FIG. 3A depicts the optimum scheduling scheme in the case of data upload.

FIG. 3B depicts another beacon scheduling scheme, which is the same as that in FIG. 3A except that the data transmission in FIG. 3B relates to a data download case, i.e., data is to be transmitted from the main node 10 to the respective terminal points of the relay nodes 115, 116. The main node 10 needs to transmit data 33f in its time slot 341 to the relay node 111. Then, the data has to wait until the next slot 332 of the relay node 111 before the data 32f, 31f can be transmitted to the relay nodes 115, 116. The wait time lasts approximately the duration between the dashed lines 35a and 35b, i.e., approximately the duration of one superframe. Similarly, the relay node 115, 116 have to wait until the next time slot before the data is transmitted to their respective terminal points (not shown). Hence, with this scheduling scheme, the download data transmission requires a time of about 10 min (5 min×2 hops) to reach its destination.

According to FIGS. 3A and 3B, the scheduling scheme of the prior art has an optimum effect for data upload, but has a poor effect for data download. In view of this, it is important to provide a better beacon scheduling approach for various nodes in a beacon-enabled wireless network to avoid transmission collisions and long transmission delay times. The overall transmission performance of the beacon-enabled wireless network would thereby be improved.

SUMMARY OF THE INVENTION

One objective of this invention is to provide an apparatus for use in a beacon-enabled wireless network. The apparatus is configured to determine an upload time slot and a download time slot it will occupy in the superframe according to a beacon it receives. The deciding process follows the following principles: (1) avoidance of any transmission collision with other equipment in the beacon-enabled wireless network, and (2) reduction of the transmission delay time in the network. The disclosed apparatus is located within a coverage area of a first equipment, while a second equipment is in turn located within a coverage area of the apparatus. The apparatus comprises a receive/transmission module and a decision module. The receive/transmission module is configured to receive a beacon from the first equipment; while the decision module is configured to decide an information of an upload time slot and an information of a download time slot of the apparatus according to the received beacon. The receive/transmission module can then perform data transmission with the first equipment in the upload time slot and the second equipment in the download time slot. Hence, transmission collisions and long transmission delay times are no longer present in the beacon-enabled wireless network.

Another objective of this invention is to provide a transmission time determination method for use in the apparatus described above. The method can determine an upload time slot and a download time slot that it will occupy in a superframe according to a beacon it receives. The deciding process follows the following principles: (1) avoidance of any transmission collision with other equipment in the beacon-enabled wireless network, and (2) reduction of the transmission delay time in the network. The disclosed apparatus is located within a coverage area of first equipment, while a second equipment is in turn located within the coverage area of the apparatus. The method comprises the following steps: receiving a beacon of the first equipment; deciding an information of an upload time slot of the apparatus according to the beacon, so that the apparatus can perform data transmission with the first equipment in the upload time slot; and deciding an information of a download time slot of the apparatus according to the received beacon, so that the apparatus can perform data transmission with the second equipment in the download time slot. In this way, transmission collisions and longer transmission delay times are prevented in the beacon-enabled wireless network.

Yet a further objective of this invention is to provide a tangible computer-readable medium storing a computer program. The computer program is configured to enable the apparatus described above to execute the transmission time determination method described above, so as to avoid any transmission collision with other equipment in the beacon-enabled wireless network and to reduce the transmission delay time in the network. The method comprises the following steps: receiving a beacon of the first equipment; deciding an information of an upload time slot of the apparatus according to the beacon, so that the apparatus can perform data transmission with the first equipment in the upload time slot; and deciding an information of a download time slot of the apparatus according to the beacon, so that the apparatus can perform data transmission with the second equipment in the download time slot. Again, transmission collisions and long transmission delay times are prevented in the beacon-enabled wireless network.

The technology disclosed in this invention can provide an apparatus in a beacon-enabled wireless network with two transmission time slots, i.e. an upload time slot and a download time slot. In this way, the apparatus will have more opportunities to transmit data during a beacon interval, thus resulting in reduced transmission delay time.

The detailed technology and preferred embodiments implemented for the subject invention are described in the

DESCRIPTION OF THE PREFERRED EMBODIMENT

Figure 1:
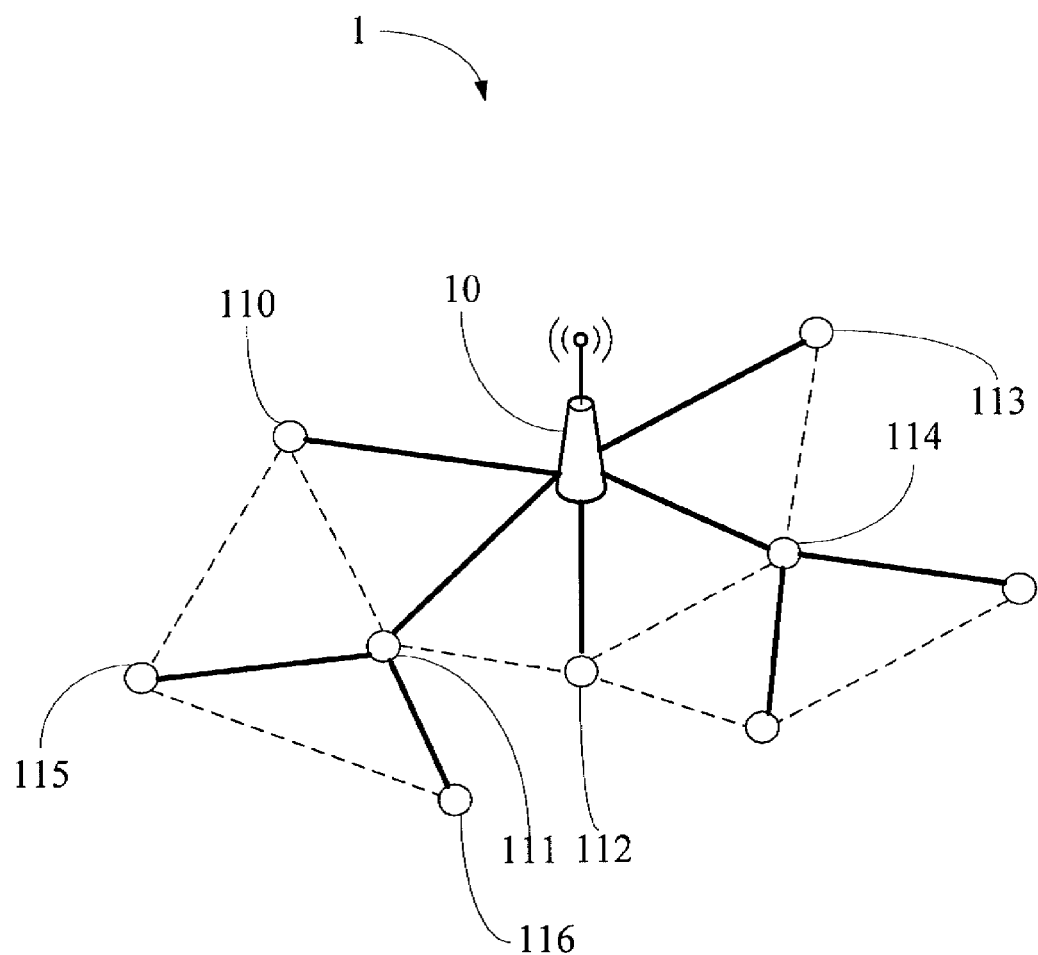
FIG. 1 is a schematic diagram of a beacon-enabled wireless network.
Figure 2:
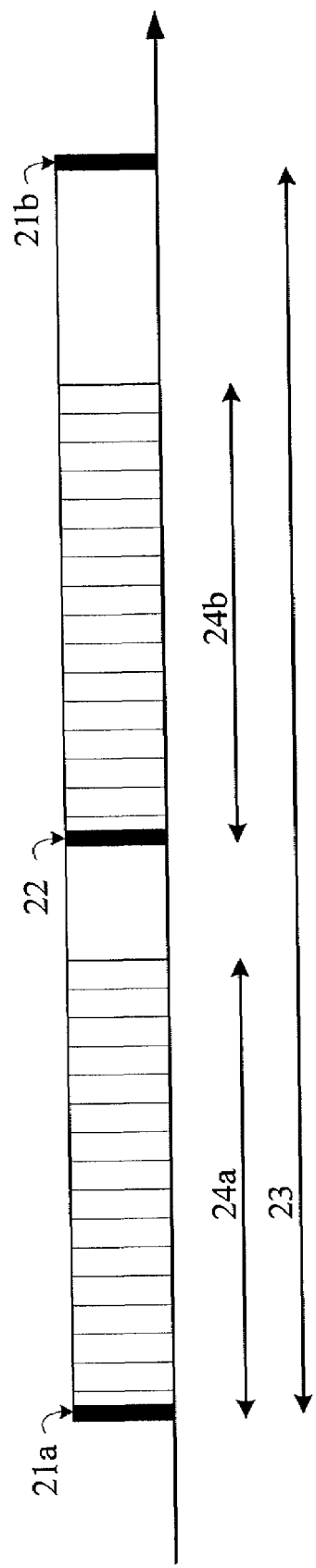
FIG. 2 is a schematic diagram of a superframe structure conforming to the IEEE 802.15.4b standard.
Figure 3A:
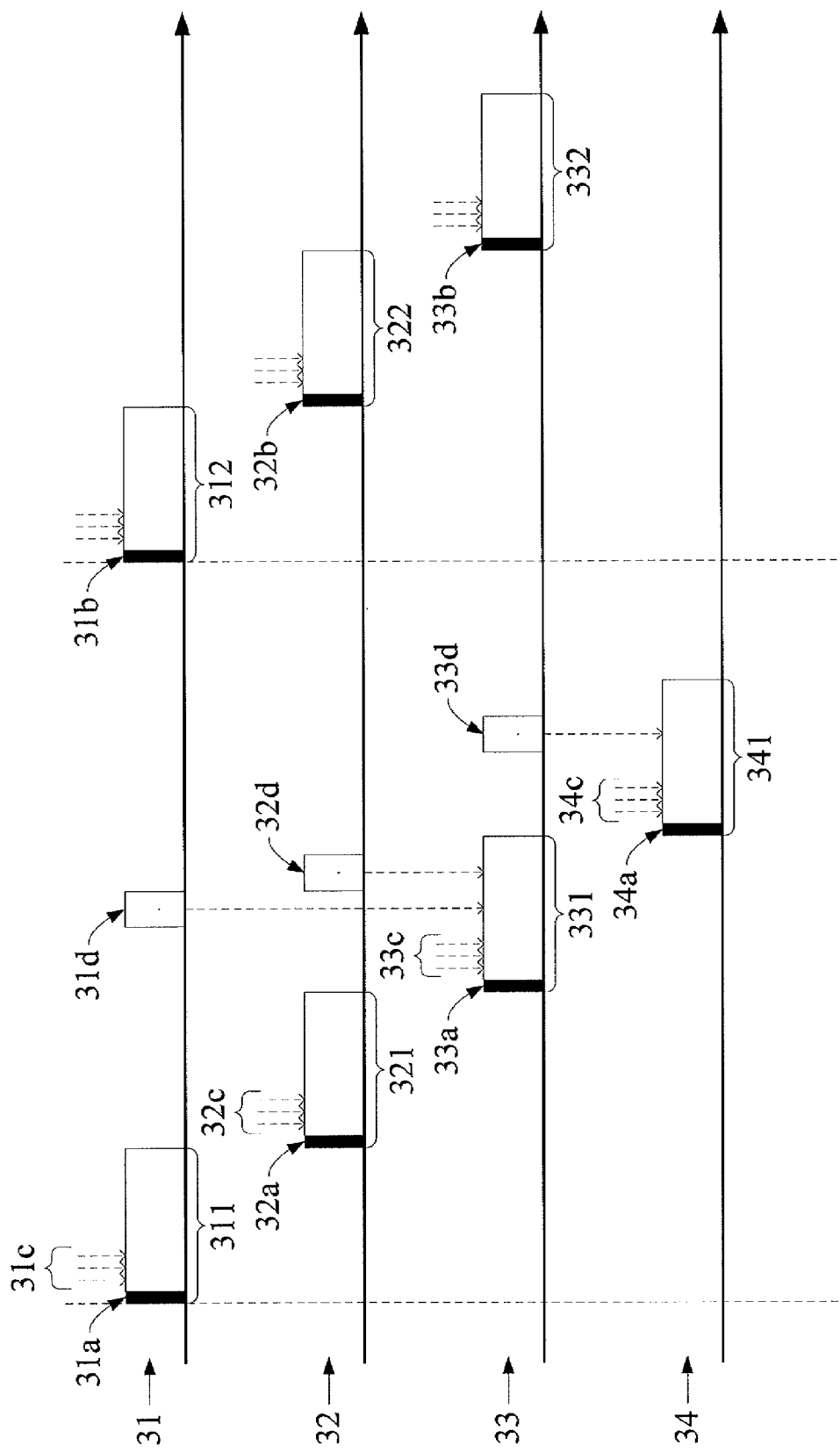
FIG. 3A depicts an example of a beacon scheduling scheme.
Figure 3B:
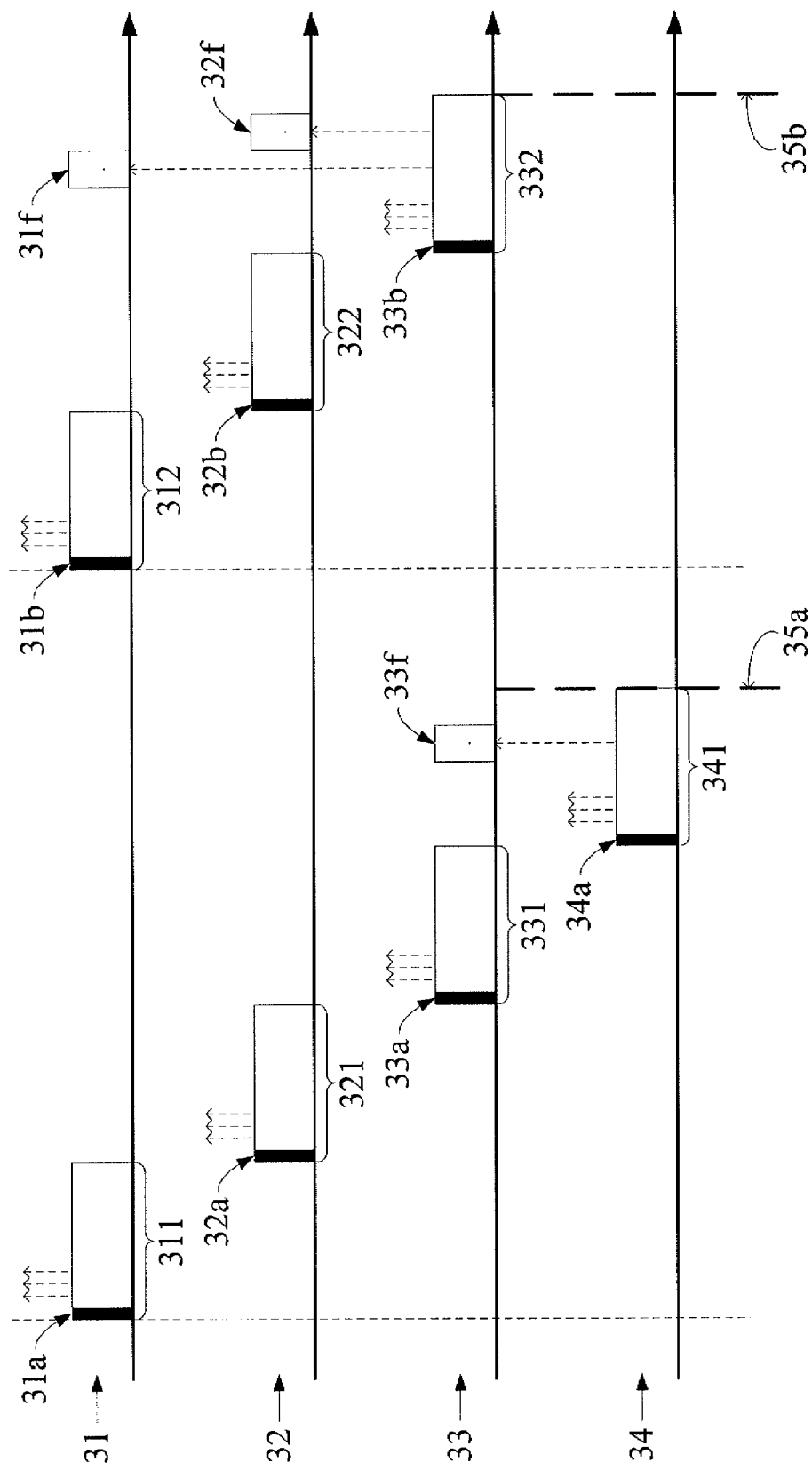
FIG. 3B depicts another example of the beacon scheduling scheme.
Figure 4:
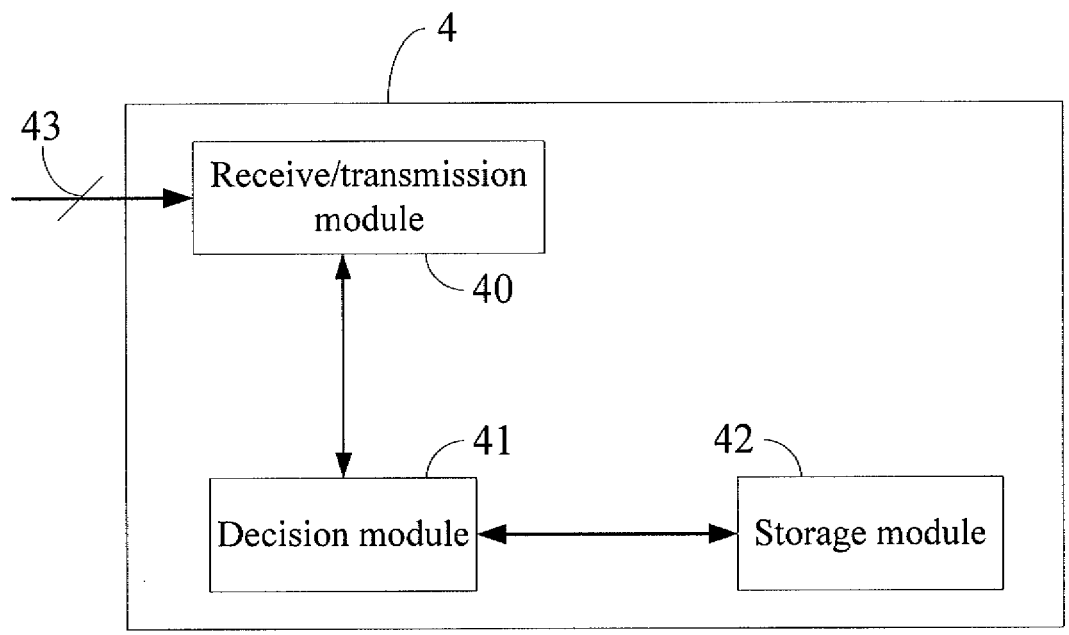
FIG. 4 is a schematic diagram of a preferred embodiment of an apparatus of the present invention.
Figure 5:
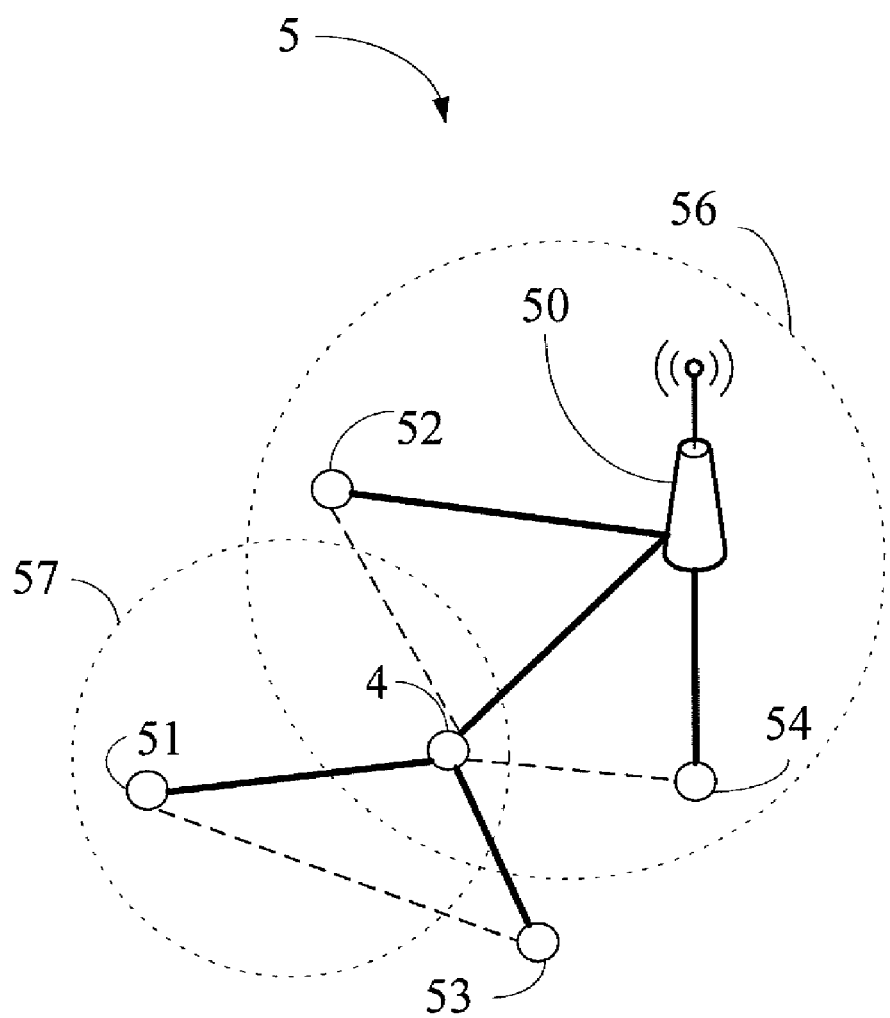
FIG. 5 is a schematic diagram of a beacon-enabled wireless network for use with the preferred embodiment of the apparatus.

One preferred embodiment of this invention is an apparatus 4 for use in a beacon-enabled wireless network, as depicted in FIG. 4. FIG. 5 depicts a beacon-enabled wireless network 5, which conforms to the IEEE 802.15.4 standard in this embodiment. In other embodiments, the beacon-enabled wireless network 5 may conform to other beacon-enabled wireless network specifications. The beacon-enabled wireless network 5 comprises the aforesaid apparatus 4 (i.e., a relay node), a first equipment 50 (i.e., the aforesaid main node), a second equipment 51 (i.e., a relay node), and a plurality of relay nodes 52, 53, 54.

The apparatus 4 is located within the coverage area 56 of the first equipment 50, while the second equipment 51 is located within the coverage area 57 of the apparatus 4. In FIG. 5, any two nodes connected by a solid line have a parent-child relationship, and transmission collision may occur between them. Any two nodes connected by a dashed line can not use the same time slot.

As shown in FIG. 4, the apparatus 4 comprises a receive/transmission module 40, a decision module 41, and a storage module 42. At first, the first equipment 50 sends a beacon 43, which comprises a time slot parameter and information about a time slot (i.e., a parent time slot) occupied by the first equipment 50, in a broadcast. The time slot parameter is used to define a plurality of time slots in the superframe of the beacon-enabled wireless network.

The receive/transmission module 40 is configured to receive the beacon 43. The decision module 41 includes a processor which is configured to decide the information of an upload time slot and information of a download time slot for the apparatus 4 according to the beacon 43. The receive/transmission module 40 can then perform data transmission with the first equipment 50 by the upload time slot and perform data transmission with the second equipment 51 by the download time slot. Here, the upload time slot is different from the download time slot. The storage module 42 is configured to store the information of the upload time slot and the information of the download time slot, so that such information can be used for transmission between the apparatus 4, the first equipment 50, and the second equipment 51.

For simplification, it is assumed in this embodiment that a superframe comprises 10 time slots and each of them lasts 3 seconds, so the superframe is in a total duration of 30 seconds. The time slots have a sequence order in time, that is, the time slots are numbered from 0 to 9 according to the sequence. In this embodiment, the information of the upload time slot is an ordering number of the upload time slot, while the information of the download time slot is an ordering number of the download time slot. The decision module 41 can then decide the ordering number of the upload time slot and the ordering number of the download time slot according to the information of the parent time slot (the time slot occupied by the first equipment 50) carried in the beacon 43. The decision module 41 decides the upload time slot to be the time slot that is unoccupied and that is nearest to and ahead of the parent time slot according to the sequence order, and the ordering number of this time slot becomes the ordering number of the upload time slot. Likewise, the decision module 41 decides the download time slot to be the time slot that is unoccupied and that is nearest to and behind the parent time slot according to the sequence order, and the ordering number of this slot becomes the ordering number of the download time slot.

Specifically, the decision module 41 can decide the ordering number of the upload time slot for the apparatus 4 according to following equation:

$$\min\{(p-m) \bmod k \neq u\},$$

wherein p represents the ordering number of the parent time slot according to the sequence order, u represents the ordering number of each of the occupied time slots according to the sequence order, k represents a total number of the time slots in the superframe, mod represents the remainder of (p−m) being divided by k, m represents the ordering number of the upload time slot according to the sequence order, and min {•} represents finding an integer m that minimizes a value of the equation. Assuming that the parent time slot has an ordering number of 5 and the occupied time slots in the superframe have ordering numbers of 3, 5, 6, and 8, the ordering number of the upload time slot for the apparatus 4 will be 4 according to the above equation.

Similarly, the decision module 41 can decide the ordering number of the download time slot for the apparatus 4 according to the following equation:

$$\min\{(n-p) \bmod k \neq u\},$$

wherein p, u, k, mod have the same meaning as described above, n represents the ordering number of the download time slot according to the sequence order, and min{•} represents finding an integer n that minimizes a value of the equation. Assuming that the parent time slot has an ordering number of 5 and the occupied time slots in the superframe have ordering numbers of 3, 4, 5, 6, and 8, the ordering number of the upload time slot for the apparatus 4 will be 7 according to the above equation.

Figure 6:
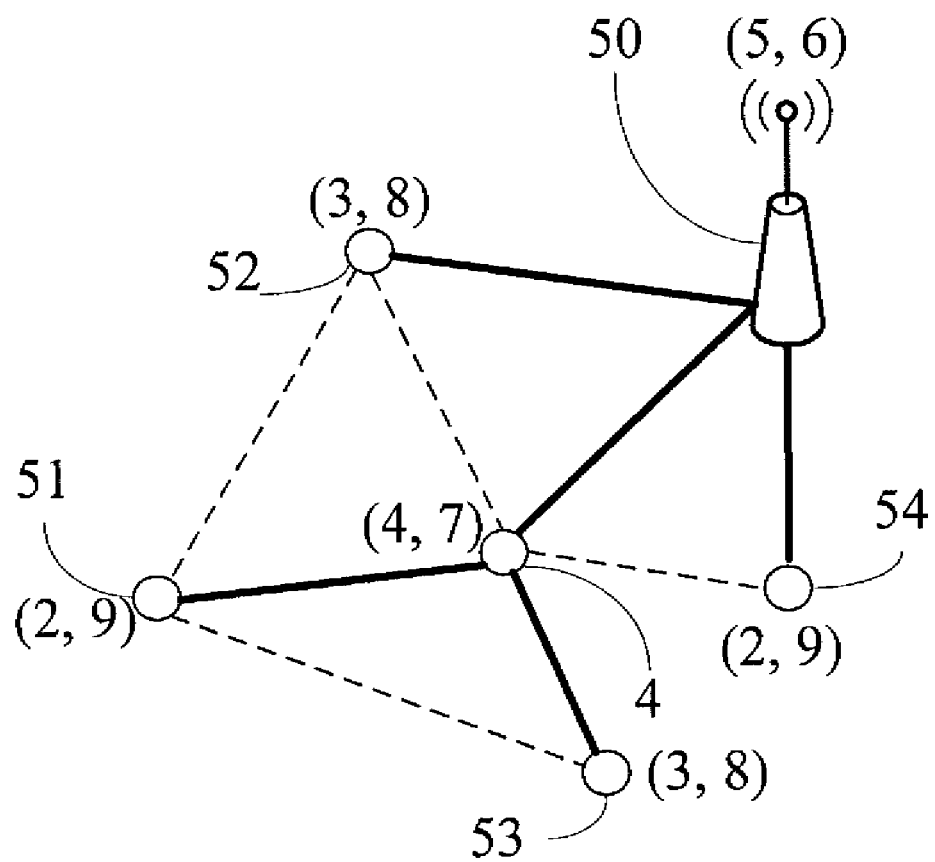
FIG. 6 is a schematic diagram of the wireless network illustrated in FIG. 5 and time slots for nodes thereof.

According to these two equations, the ordering numbers of the upload and the download time slots can be obtained. The corresponding upload and download time slots are distinct from the parent time slot. Similarly, the upload time slots (and ordering numbers thereof) and download time slots (and ordering numbers thereof) may also be decided in the same manner for other nodes of FIG. 5, so that no transmission collision would occur in the beacon-enabled wireless network 5. The calculation results are shown in FIG. 6, where the left field within each pair of parentheses represents the upload time slot of the node, while the right field represents the download time slot.

According to the aforementioned configurations, the two time slots are used in the disclosed apparatus as an outgoing superframe for data transmission. The apparatus can then designate, according to the received beacon, the unoccupied time slot that is nearest to and ahead of the parent time slot to be the upload time slot, and the unoccupied time slot that is nearest to and behind the parent time slot to be the download time slot. Moreover, the upload and the download time slots are staggered with those occupied by other equipment (i.e., nodes) that may cause a transmission collision, thus, avoiding transmission collisions.

Figure 7:
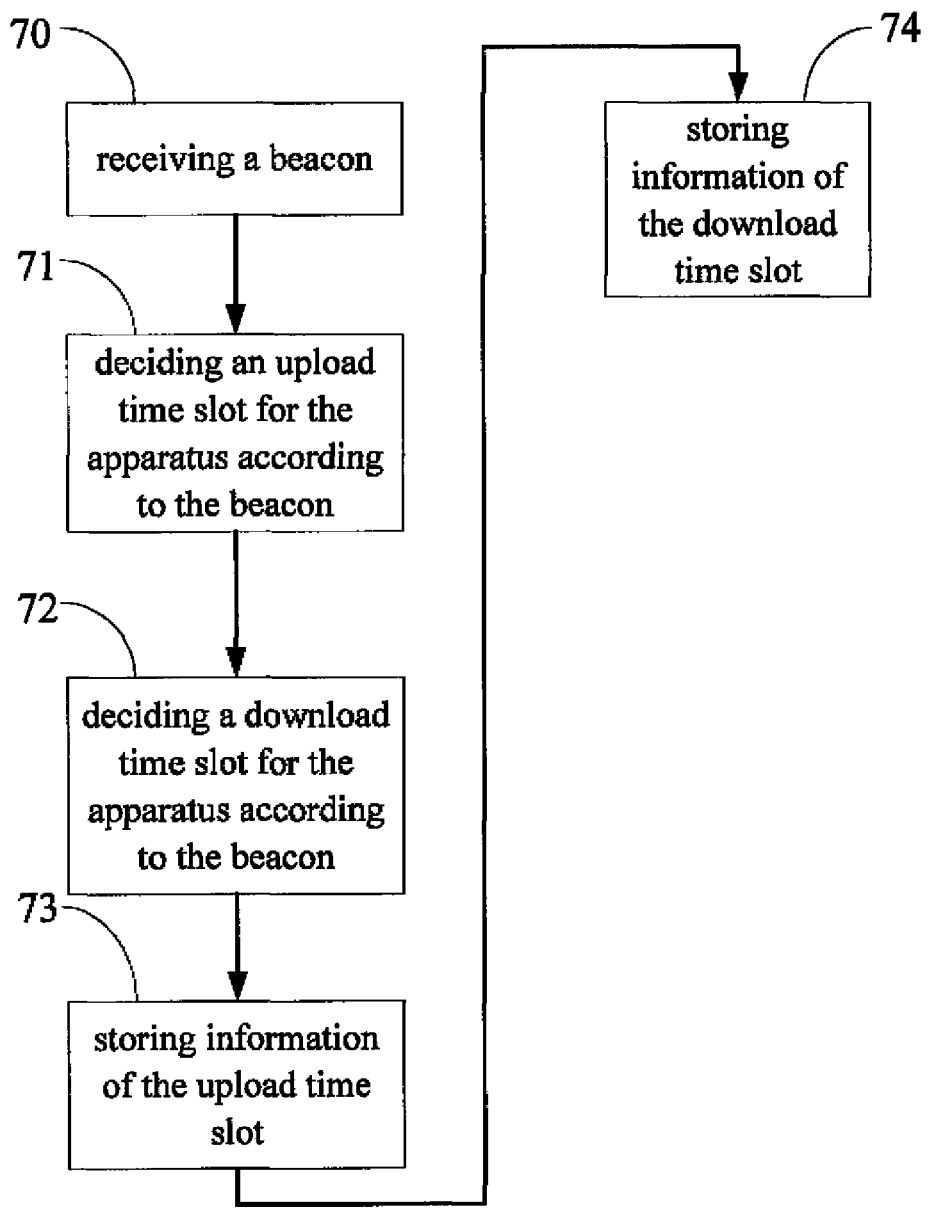
FIG. 7 is a flow chart of a preferred embodiment of a method of the present invention.

Another preferred embodiment of this invention is the transmission time determination method, a flow chart of which is depicted in FIG. 7. This method is used for an apparatus in a beacon-enabled wireless network, wherein the apparatus is located within the coverage area of the first equipment, and the second equipment is located within the coverage area of the apparatus. In particular, the method is executed by a computer program controlling the apparatus.

This method begins with step 70, where a beacon is received from the first equipment. This beacon is similar to the one described in the above embodiment, and therefore will not be described again. Next in step 71, information of an upload time slot is decided according to the beacon for the apparatus, so that the apparatus can perform data transmission with the first equipment in the upload time slot. Specifically, the information of the upload time slot in this embodiment is the ordering number of the upload time slot. In step 71, the upload time slot is decided to be the time slot that is unoccupied and that is nearest to and ahead of the parent time slot, and its ordering number becomes the ordering number of the upload time slot. In more detail, the ordering number of the upload time slot in step 71 can be decided according to the following equation:

$$\min\{(p-m) \bmod k \neq u\}.$$

This equation is just the same as described in the above embodiment, and will not be described again.

Then, in step 72, information of download time slot is decided according to the beacon, so that the apparatus can perform data transmission with the second equipment in the download time slot. Specifically, the information of the download time slot in this embodiment is the ordering number of the download time slot. In step 72, the download time slot is decided to be the time slot that is unoccupied and that is nearest to and behind the parent time slot, and its ordering number becomes that of the download time slot. In more detail, the ordering number of the download time slot in step 72 may be decided according to the following equation:

$$\min\{(n-p) \bmod k \neq u\}.$$

This equation is just the same as described in the above embodiment and will not be described again.

Once decided, the information from the upload and the download time slots are stored in step 53 and step 54 respectively for use in data transmission of the apparatus.

In addition to the steps shown in FIG. 7, this embodiment can also execute all the operations and functions of the above embodiment. Those of ordinary skill in the art will readily know how to execute the corresponding operations and functions in this embodiment by considering those in the first embodiment; therefore, a detailed description will be omitted here.

The method described above may be embodied in a tangible computer-readable medium storing the previously described computer program to execute the above steps. The tangible computer-readable medium may be a soft disc, a hard disc, a compact disc, a mobile disc, a magnetic tape, a database accessible via a network, or any storage medium that is known to those skilled in the art to have similar functions.

It follows from the above description that, by use of this invention in a beacon-enabled wireless network, an apparatus of the wireless network may be allocated two time slots in a beacon interval, thereby, having more opportunities to transmit data to other apparatuses in the wireless network. This invention can designate time slots that are nearest to the parent time slot according to a sequence order in time as the upload and download time slot. Moreover, the upload and the download time slots are staggered with those occupied by other equipment (i.e., nodes) to prevent transmission collisions. In this way, both the transmission collision and the increased transmission delay can be prevented in a beacon-based wireless network.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An apparatus for use in a beacon-enabled wireless network, the apparatus being located within a coverage area of a first equipment, a second equipment being located within a coverage area of the apparatus, the apparatus comprising:
   a receive/transmission module being configured to receive a beacon of the first equipment, the beacon comprising a time slot parameter for defining a plurality of time slots in a superframe of the beacon-enabled wireless network, the time slots having a sequence order, the first equipment occupying one of the time slots as a parent time slot; and
   a decision module being electrically connected to the receive/transmission module and, the decision module including a processor, the processor being configured to decide an information of an upload time slot and an information of a download time slot of the apparatus according to the beacon, so that the receive/transmission module can perform data transmission with the first equipment in the upload time slot and perform data transmission with the second equipment by the download time slot,
   wherein the upload time slot and the download time slot are two different ones of the time slots and the decision module decides the upload time slot to be the time slot that is unoccupied and that is nearest to and ahead of the parent time slot according to the sequence order.

2. The apparatus of claim 1, further comprising:
   a storage module being electrically connected to the decision module and being configured to store the information of the upload time slot and the information of the download time slot.

3. The apparatus of claim 1, wherein the information of the upload time slot is an ordering number of the upload time slot, and the decision module decides the ordering number of the upload time slot according to following equation:

$$\min\{(p-m) \bmod k \neq u\},$$

wherein p represents an ordering number of the parent time slot according to the sequence order, u represents an ordering number of each of the occupied time slots according to the sequence order, k represents a total number of the time slots in the superframe, mod represents the remainder of (p−m) being divided by k, m represents the ordering number of the upload time slot according to the sequence order, and min{•} represents finding an integer m that minimizes a value of the equation.

4. The apparatus of claim 1, wherein the decision module decides the download time slot to be the time slot that is unoccupied and that is nearest to and behind the parent time slot according to the sequence order.

5. The apparatus of claim 4, wherein the information of the download time slot is an ordering number of the download time slot, the decision module decides the ordering number of the download time slot according to following equation:

$$\min\{(n-p)\bmod k \neq u\},$$

wherein p represents an ordering number of the parent time slot according to the sequence order, u represents an ordering number of each of the occupied time slots according to the sequence order, k represents a total number of the time slots in the superframe, mod represents the remainder of (n−p) being divided by k, n represents the ordering number of the download time slot according to the sequence order, and min{•} represents finding an integer n that minimizes a value of the equation.

6. A transmission time determination method for use in an apparatus of a beacon-enabled wireless network, the apparatus being located within a coverage area of a first equipment, a second equipment being located within a coverage area of the apparatus, the transmission time determination method comprising the following steps of:
  receiving a beacon of the first equipment, the beacon comprising a time slot parameter for defining a plurality of time slots in a superframe of the beacon-enabled wireless network, the time slots having a sequence order, the first equipment occupying one of the time slots as a parent time slot;
  deciding an information of an upload time slot of the apparatus according to the beacon, so that the apparatus can perform data transmission with the first equipment in the upload time slot; and
  deciding an information of a download time slot of the apparatus according to the beacon, so that the apparatus can perform data transmission with the second equipment in the download time slot;
  wherein the upload time slot and the download time slot are two different ones of the time slots and the upload time slot is the time slot that is unoccupied and that is nearest to and ahead of the parent time slot according to the sequence order.

7. The transmission time determination method of claim 6, further comprising the following step of:
  storing the information of the upload time slot; and
  storing the information of the download time slot.

8. The transmission time determination method of claim 6, wherein the information of the upload time slot is an ordering number of the upload time slot, and the step of deciding the upload time slot decides the ordering number of the upload time slot according to following equation:

$$\min\{(p-m)\bmod k \neq u\},$$

wherein p represents an ordering number of the parent time slot according to the sequence order, u represents an ordering number of each of the occupied time slots according to the sequence order, k represents a total number of the time slots in the superframe, mod represents the remainder of (p−m) being divided by k, m represents the ordering number of the upload time slot according to the sequence order, and min{•} represents finding an integer m that minimizes a value of the equation.

9. The transmission time determination method of claim 6, wherein the step of deciding the information of the download time slot decides the download slot to be the time slots that is unoccupied and that is nearest to and behind the parent time slot according to the sequence order.

10. The transmission time determination method of claim 9, wherein the information of the download time slot is an ordering number of the download time slot, the step of deciding the information of the download time slot decides the ordering number of the download time slot according to following equation:

$$\min\{(n-p)\bmod k \neq u\}$$

wherein p represents an ordering number of the parent time slot according to the sequence order, u represents an ordering number of each of the occupied time slots according to the sequence order, k represents a total number of the time slots in the superframe, mod represents the remainder of (n−p) being divided by k, n represents the ordering number of the download time slot according to the sequence order, and min{•} represents finding an integer n that minimizes a value of the equation.

11. A non-transitory computer readable medium storing a computer program to enable an apparatus of a beacon-enabled wireless network to execute a transmission time determination method, the apparatus being located within a coverage area of a first equipment, a second equipment being located within a coverage area of the apparatus, the transmission time determination method comprising the following steps of:
  receiving a beacon of the first equipment, the beacon comprising a time slot parameter for defining a plurality of time slots in a superframe of the beacon-enabled wireless network, the time slots having a sequence order, the first equipment occupying one of the time slots as a parent time slot;
  deciding an information of an upload time slot of the apparatus according to the beacon, so that the apparatus can perform data transmission with the first equipment in the upload time slot; and
  deciding an information of a download time slot of the apparatus according to the beacon, so that the apparatus can perform data transmission with the second equipment in the download time slot;
  wherein the upload time slot and the download time slot are two different ones of the time slots and the upload time slot is the time slot that is unoccupied and that is nearest to and ahead of the parent time slot according to the sequence order.

12. The non-transitory computer readable medium of claim 11, wherein the transmission time determination method further comprises the following step of:
  storing the information of the upload time slot; and
  storing the information of the download time slot.

13. The non-transitory computer readable medium of claim 11, wherein the information of the upload time slot is an ordering number of the upload time slot, the step of deciding the information of the upload time slot decides the ordering number of the upload time slot according to following equation:

$$\min\{(p-m)\bmod k \neq u\},$$

wherein p represents an ordering number of the parent time slot according to the sequence order, u represents an ordering number of each of the occupied time slots according to the sequence order, k represents a number of the time slots, mod represents the remainder of (p−m) being divided by k, m represents the ordering number of the upload time slot according to the sequence order, and min{•} represents finding an integer m that minimizes a value of the equation.

14. The non-transitory computer readable medium of claim 11, wherein the step of deciding the information of the download time slot decides the download time slot to be the time slot that is unoccupied and that is nearest to and behind the parent time slot according to the sequence order.

15. The non-transitory computer readable medium of claim 14, wherein the information of the download time slot is an ordering number of the download time slot, the step of deciding the information of the download time slot decides the ordering number of the download time slot according to following equation:

$$\min\{(n-p) \bmod k \neq u\},$$

wherein p represents an ordering number of the parent time slot according to the sequence order, u represents an ordering number of each of the occupied time slots according to the sequence order, k represents a number of the time slots, mod represents the remainder of (n−p) being divided by k, n represents the ordering number of the download time slot according to the sequence order, and min{•} represents finding an integer n that minimizes a value of the equation.

* * * * *